US012162037B1

(12) United States Patent
Hirshberg

(10) Patent No.: US 12,162,037 B1
(45) Date of Patent: Dec. 10, 2024

(54) VIBRATORY OBJECT-SORTING APPARATUS

(71) Applicant: Jay Hirshberg, Fort Myers, FL (US)

(72) Inventor: Jay Hirshberg, Fort Myers, FL (US)

( * ) Notice: Subject to any disclaimer, the term of this patent is extended or adjusted under 35 U.S.C. 154(b) by 0 days.

(21) Appl. No.: 18/216,002

(22) Filed: Jun. 29, 2023

(51) Int. Cl.
*B07B 1/30* (2006.01)
*B07B 1/28* (2006.01)
*B07B 1/42* (2006.01)

(52) U.S. Cl.
CPC ................ *B07B 1/30* (2013.01); *B07B 1/284* (2013.01); *B07B 1/42* (2013.01)

(58) Field of Classification Search
CPC ....... B07B 1/36; B07B 1/469; B07B 2201/04; B07B 1/30; F42B 35/02
See application file for complete search history.

(56) References Cited

U.S. PATENT DOCUMENTS 2,358,453 A * 9/1944 Gilson ............... G01N 15/0272 209/346
2,399,280 A 4/1946 McDonell
2,753,999 A * 7/1956 Mathewson .............. B07B 1/38 209/403
3,315,807 A 4/1967 Rosen
3,367,498 A 2/1968 Tonjes et al.
3,794,165 A * 2/1974 Riesbeck .................. B07B 1/42 209/325
4,233,151 A * 11/1980 Gundlach ................. B07B 1/28 209/342
4,848,607 A * 7/1989 Halley ...................... B07B 1/46 209/365.2
5,541,831 A 7/1996 Thomas
7,403,872 B1 7/2008 St. Onge et al.
7,987,990 B2 8/2011 Srivatsan
8,297,446 B2 10/2012 Spence, Jr.
8,991,618 B2 3/2015 Green
10,758,940 B1 * 9/2020 Young ....................... B07B 1/02

(Continued)

FOREIGN PATENT DOCUMENTS

CN 107824430 A 3/2018
CN 108580324 A 9/2018

(Continued)

OTHER PUBLICATIONS

International Search Report and Written Opinion, dated May 24, 2022, for related International application No. PCT/ US2022/ 017216 (15 pages).

(Continued)

*Primary Examiner* — Joseph C Rodriguez
(74) *Attorney, Agent, or Firm* — Polsinelli PC

(57) ABSTRACT

An object-sorting apparatus includes a vibration base that includes a vibration element. The object-sorting apparatus also includes a plurality of stages stackable on the vibration base, wherein at least one of the stages includes walls defining a central opening, and a sorting floor that cooperates with the walls to form a receptacle. The sorting floor includes a plurality of apertures defined in and extending through the sorting floor and into flow communication through the central opening with a next lower one of the plurality of stages. The apertures of the at least one stage are sized to receive therethrough objects having a size smaller than a target size associated with the at least one stage.

20 Claims, 6 Drawing Sheets

(56) References Cited

U.S. PATENT DOCUMENTS

| | | | | |
|---|---|---|---|---|
| 11,648,587 | B2 * | 5/2023 | Hirshberg | F42B 33/10 209/315 |
| 2006/0243643 | A1 | 11/2006 | Scott et al. | |
| 2014/0260925 | A1 | 9/2014 | Beach et al. | |
| 2015/0283581 | A1 | 10/2015 | Jones et al. | |
| 2016/0101440 | A1 | 4/2016 | Grygierczyk et al. | |
| 2018/0369867 | A1 * | 12/2018 | Sobecki | B07B 13/16 |

FOREIGN PATENT DOCUMENTS

| | | | |
|---|---|---|---|
| CN | 109317402 | B | 12/2020 |
| WO | 2014/066893 | A1 | 5/2014 |

OTHER PUBLICATIONS

U.S. Appl. No. 18/131,217, filed Apr. 25, 2023, entitled Automated Object-Sorting Apparatus.

"Semi-Auto Shell Sorting with Plates—YouTube", retrieved on May 29, 2023 from https://www.youtube.com/watch?v=-HaiW8e33a0.

"Shell Sorter Plate, for Sorting Brass, 380 Plate, by The Shell Sorter", Dawson Precision, Inc., retrieved on May 29, 2023 from https://dawsonprecision.com/shell-sorter-plate-for-sorting-brass-380-plate-by-the-shell-sorter/.

"Shell Sorter Set, for Sorting Brass, 3 Options, by The Shell Sorter", Dawson Precision, Inc., retrieved on May 29, 2023 from https://dawsonprecision.com/shell-sorter-set-for-sorting-brass-3-options-by-the-shell-sorter/.

* cited by examiner

VIBRATORY OBJECT-SORTING APPARATUS

The field of the disclosure relates generally to sorting objects and, more particularly, to an apparatus for automatically sorting a mixture of objects into batches, with each batch corresponding to a standard size of the object.

BACKGROUND

There are applications in which it is necessary to sort a mixture of differently sized objects into batches, with each batch containing objects of a standard size. One such application arises in the context of reloading of spent ammunition casings. The spent casings are typically obtained (e.g., collected from the floor of a shooting range) in lots that include a plurality of different sizes (i.e., different calibers) mixed together. An ammunition cartridge reloader must separate the mixture of spent casings into caliber-specific batches, in order to efficiently reload the spent casings to produce live cartridges for each caliber. However, manual sorting of the many different calibers of spent cases is labor- and time-intensive.

One known method of sorting a mixture of sizes of spent casings is to use pans with a grating on the bottom. A width of the grating apertures for each pan is sized to pass any object smaller than a corresponding caliber of casing, thus retaining a given caliber of casing in each pan. However, the pans must be manually shaken until the smaller objects align with and fall through a grating aperture, which requires significant time and manual effort. In addition, adding more than a few spent casings to the pan typically causes the apertures to become blocked or clogged, necessitating frequent pauses to empty the pan and add a few more spent casing from the mixture. In addition, some systems have added mechanical vibrating elements to slotted-bottom pans to sort spent casings. However, throughput can be slow for some mixtures and it is difficult to tune or reconfigure such systems. Moreover, if such known systems are sized to process more than a small capacity of spent casings, a size and weight of the system makes it difficult to transport and handle, and difficult to store when not in use. In addition, a power draw of such systems requires an operating location near a facility power outlet. As a result, such systems can effectively require a permanent footprint in the usable floor space of a user's facility near a dedicated power outlet, although the system is only in operation a small percentage of the time.

In other known systems, the spent casings are fed single-file along a track and, as the width of a slot in the bottom of the track increases along the track length, spent casings of a correspondingly larger caliber drop through the slot at corresponding locations. However, such track-based systems require an exceedingly large footprint to accommodate not only the necessary plurality of slot-width sections along the track, but also the feeding apparatus that must be used to supply spent casings one-at-a-time to each track. Moreover, the single-file sorting process requires significant amount of time to process a large number of spent casings.

Accordingly, an easily portable, storable, and reconfigurable apparatus that automatically sorts a mixture of differently sized objects into batches of uniform standard-sized objects, without requiring a permanent footprint near facility power, would find utility.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, an object-sorting apparatus is provided. The object-sorting apparatus includes a vibration base that includes a vibration element. The object-sorting apparatus also includes a plurality of stages stackable on the vibration base, wherein at least one of the stages includes walls defining a central opening, and a sorting floor that cooperates with the walls to form a receptacle. The sorting floor includes a plurality of apertures defined in and extending through the sorting floor and into flow communication through the central opening with a next lower one of the plurality of stages. The apertures of the at least one stage are sized to receive therethrough objects having a size smaller than a target size associated with the at least one stage.

In another aspect, a method is provided. The method includes selecting a first sorting floor from among a plurality of sorting floors. Each of the sorting floors includes a plurality of apertures extending therethrough, and a minor dimension of the apertures of the first sorting floor is different from the minor dimension of the apertures of others of the sorting floors. The selection is based on the minor dimension of the apertures of the first sorting floor being sized to capture a target object. The method can also include inserting the first sorting floor from above walls of a first stage into a position resting on a lip, the lip defining a central opening extending therethrough, wherein the inserted sorting floor cooperates with the walls to form a receptacle. The method can further include stacking a second stage atop a vibration base including a vibration element, and stacking the first stage atop the second stage.

In another aspect, a method is provided. The method includes selecting a first set of springs from among a plurality of sets of springs. A spring stiffness of the springs of the first set is different from the spring stiffness of the springs of others of the sets, and the selection is based on the spring stiffness of the springs of the first set being associated with efficient sorting of a mixture of objects of predetermined sizes. The method can also include coupling the first set of springs between a vibration platform and a foundation to form a vibration base, wherein the vibration base includes a vibration element. The method can further include stacking a plurality of stages atop the vibration platform, wherein at least one of the stages includes walls and a sorting floor that cooperates with the walls to form a receptacle. The sorting floor includes a plurality of apertures defined in and extending through the sorting floor and into flow communication with a next lower one of the plurality of stages, and the apertures of the at least one stage are sized to receive therethrough objects having a size smaller than a target size associated with the at least one stage.

BRIEF DESCRIPTION OF THE SEVERAL VIEWS OF THE DRAWINGS

In order to describe the manner in which the above-recited issues can be addressed, a more particular description of the principles briefly described above will be rendered by reference to specific embodiments thereof that are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
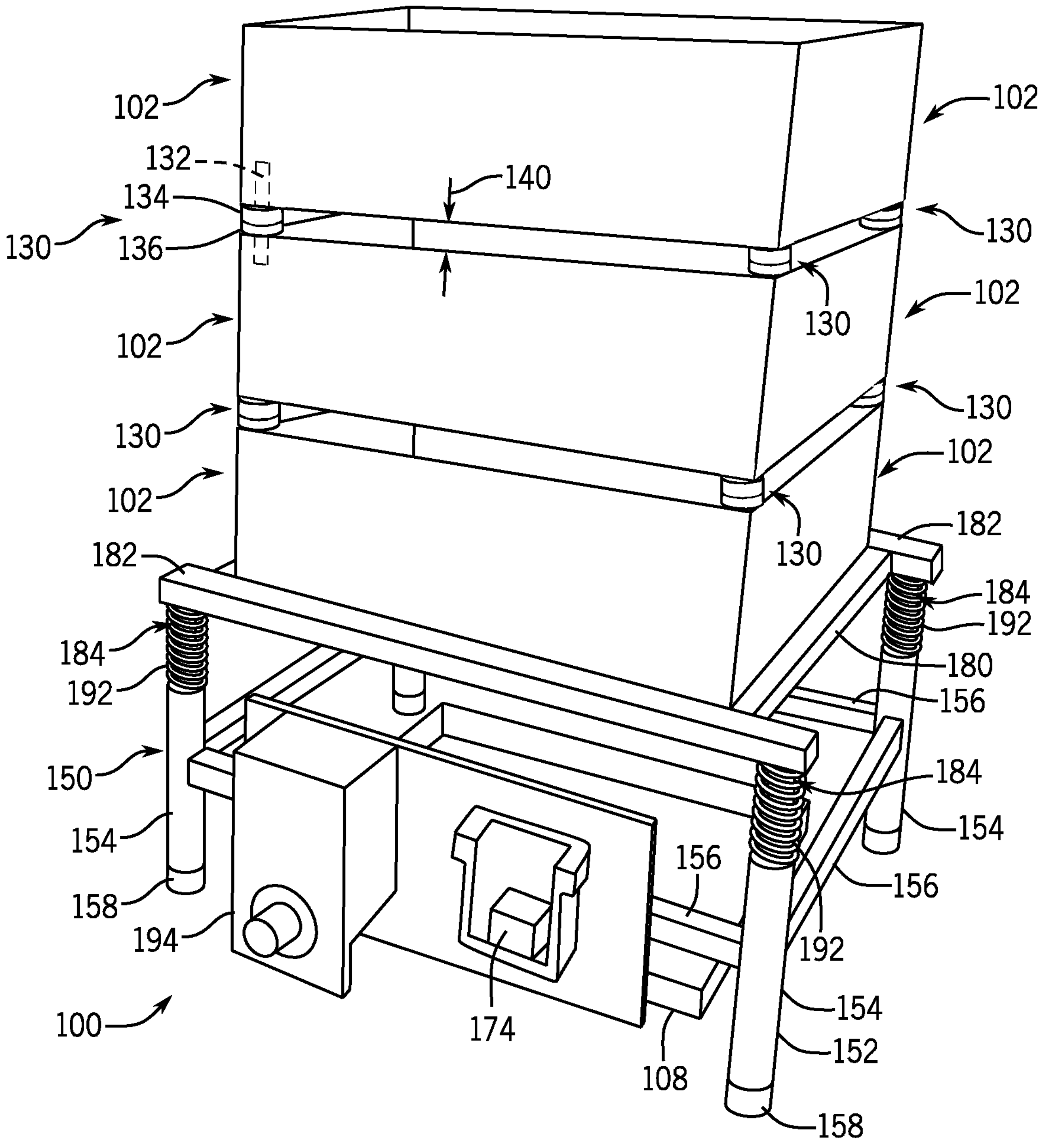
FIG. 1 is a perspective view of an example embodiment of an object-sorting apparatus.

Various example embodiments of the disclosure are discussed in detail below. While specific implementations are discussed, it should be understood that this description is for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment. Such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others. Any feature of one example can be integrated with or used with any other feature of any other example.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various example embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

For clarity of explanation, in some instances the present technology may be presented as including individual functional blocks representing devices, device components, steps or routines in a method embodied in software, or combinations of hardware and software.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term).

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Figure 2:
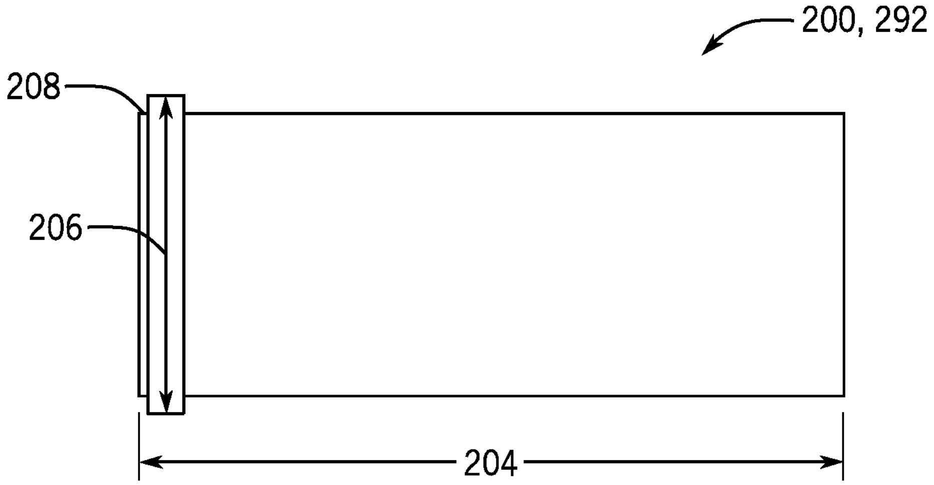
FIG. 2 is an elevation view of an example first object that may be among a mixture of objects for sorting by the object-sorting apparatus of FIG. 1.
Figure 3:
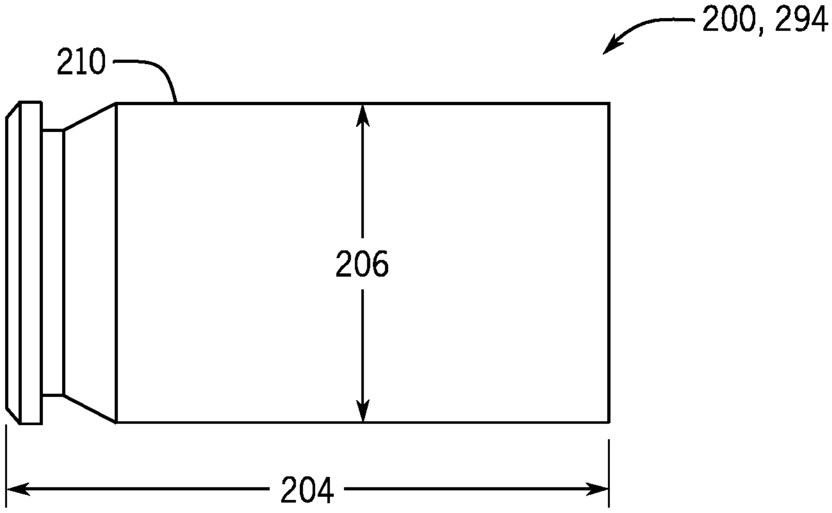
FIG. 3 is an elevation view of an example second object that may be among a mixture of objects for sorting by the object-sorting apparatus of FIG. 1.
Figure 4:
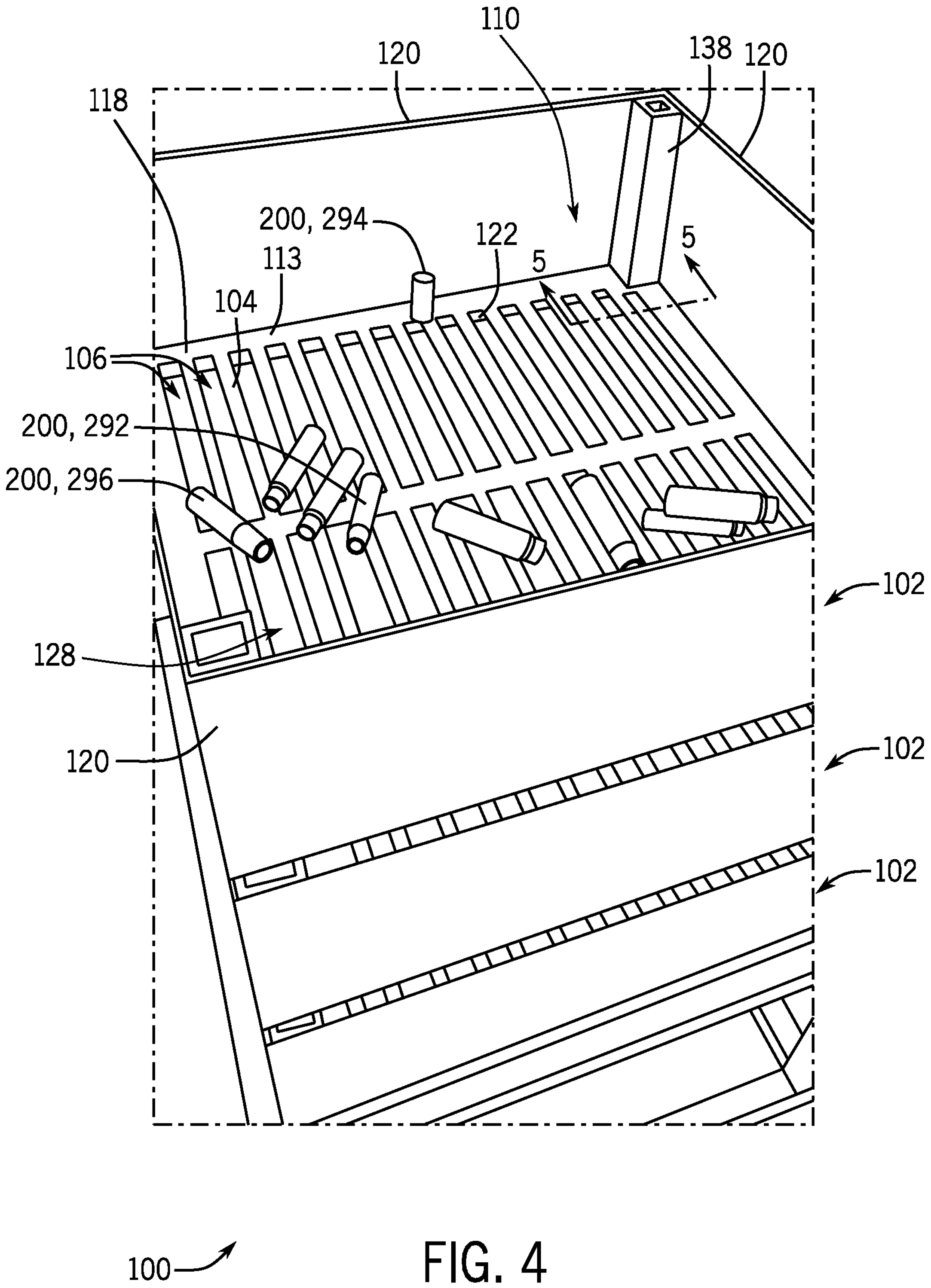
FIG. 4 is another perspective view of the apparatus of FIG. 1, including a mixture of example objects in an example embodiment of a stage of the apparatus.

FIG. 1 is a perspective view of an example embodiment of an object-sorting apparatus 100. FIG. 2 is an elevation view of an example first object 292 that may be among a mixture of objects 200 for sorting by object-sorting apparatus 100, and FIG. 3 is an elevation view of an example second object 294 that may be among the mixture of objects 200 for sorting by object-sorting apparatus 100. FIG. 4 is another perspective view of the object-sorting apparatus 100, including a mixture of example objects 200 on an example embodiment of a stage 102 of the apparatus.

Object-sorting apparatus 100 includes a vibration base 150 and a plurality of stages 102 arranged in a vertical sequence atop the vibration base 150. Object-sorting apparatus 100 is configured to automatically sort the mixture of objects 200 of different standard sizes into batches of same-sized objects 200. More specifically, at least one stage 102 is configured to capture a batch of objects 200 having a predetermined, standard target size from the mixture and pass smaller-sized objects 200 through to the next lower stage 102.

In the example embodiment, each stage 102 can include a sorting floor 104 that at least partially defines a floor of the stage 102. As will be described in more detail below, the sorting floor 104 need not be permanently affixed to the stage 102, but can be one of several interchangeable sorting floors 104 receivable by the stage 102. A plurality of apertures 106 are defined in sorting floor 104. More specifically, apertures 106 extend through sorting floor 104 and into flow communication with the next lower stage 102, which is located directly underneath sorting floor 104. Apertures 106 of each stage 102 are sized to receive therethrough objects 200 having a size smaller than the target size for the stage, thus causing sorting floor 104 to retain thereon objects 200 having a size equal to (or larger than) the target size.

As shown in FIGS. 2 and 3, in some embodiments, objects 200 are generally elongated in shape and have a major (i.e., longest) dimension 204 and a minor (i.e., shortest) dimension 206. In order for each stage 102 to retain only objects 200 having a target size (or larger), apertures 106 for the stage 102 must correspondingly have a minor dimension 116 (shown in FIG. 5) sized to pass through objects 200 having minor dimension 206 less than the minor dimension 206 of the target object 200, but to stop or block objects 200 having minor dimension 206 equal to (or greater than) the minor dimension 206 of the target object 200.

For example, first objects 292 are rimmed spent casings, and minor dimension 206 is defined by a diameter of a rim 208 of the spent casing. In some embodiments, first objects 292 may include spent casings from 0.38 special ammunition rounds, typically having minor dimension 206 of 0.440 inches.

For another example, second objects 294 are straight-walled or rimless spent casings, and minor dimension 206 is defined by a diameter of a body 210 of the spent casing. In some embodiments, second objects 294 may include spent casings from 9 millimeter ammunition rounds, typically having minor dimension 206 of 0.392 inches For another example, third objects 296 (shown in FIG. 4) may include spent casings from 0.45 caliber ACP ammunition rounds, typically having minor dimension 206 of 0.480 inches, or from 0.40 caliber ammunition rounds, typically having minor dimension 206 of 0.424 inches.

Alternatively, objects 200 include any suitable type and/or size of objects that are sortable based on a minor dimension 206.

Object-sorting apparatus 100 is configured to receive the mixture of objects 200 at a first or top stage 102. For example, the mixture of objects 200 is manually poured or otherwise conveyed onto sorting floor 104 of top stage 102, as shown in FIG. 4. The stages 102 are arranged vertically from top stage 102 to a last or bottom stage 102, adjacent to vibration base 150, in order of decreasing size of apertures 106. For example, in the illustrated embodiment, object-sorting apparatus 100 includes three stages 102, corresponding to an expected composition of three or four standard sizes of objects 200 within the mixture of objects 200. The top or first stage 102 is selected to have apertures 106 slightly smaller than a largest of the included sizes, the next lower or second stage is selected to have apertures 106 slightly smaller than a second largest of the included sizes, and the next lower or third stage is selected to have apertures 106 slightly smaller than a third largest of the included sizes. In some embodiments, a residual tray 108 can be positioned under the final stage 102 to receive a fourth largest of the included sizes. For example, the residual tray 108 can be a free-standing tray that rests on a same surface 300 as the vibration base 150 and fits within a footprint defined by the vibration base 150. Other implementations of the residual tray 108 are also contemplated. Alternatively, the bottom (in the illustrated example, third) stage 102 is configured to retain all remaining smaller objects 200. In other words, the bottom stage may have a substantially closed sorting floor 104 (not shown), and the object-sorting apparatus 100 in a three-stage configuration sorts no more than three sizes.

In one non-limiting example, the mixture of objects 200 includes spent casings from 9 millimeter ammunition rounds, 0.40 caliber ammunition rounds, 0.38 special ammunition rounds, and 0.45 caliber ACP ammunition rounds. Accordingly, apertures 106 for the first (top) stage 102 have minor dimension 116 of 0.445 inches to pass through all objects except the spent 0.45 caliber ACP casings, apertures 106 for the second stage 102 have minor dimension 116 of 0.430 inches to pass through all remaining objects except the spent 0.38 special casings, and apertures 106 for the third stage 102 have minor dimension 116 of 0.410 inches to pass through all remaining objects except the spent 0.40 caliber casings. The residual tray 108 collects the remaining spent 9 millimeter casings.

Alternatively, object-sorting apparatus 100 includes any suitable number of stages 102 corresponding to any expected composition of standard sizes of objects 200.

The vertical arrangement of stages 102 in order of decreasing size of apertures 106 enables object-sorting apparatus 100 to receive and efficiently sort a mixture of several sizes of objects 200 into single-size batches with a greatly reduced footprint, as compared to at least some known automated object-sorting apparatuses.

Figure 5:
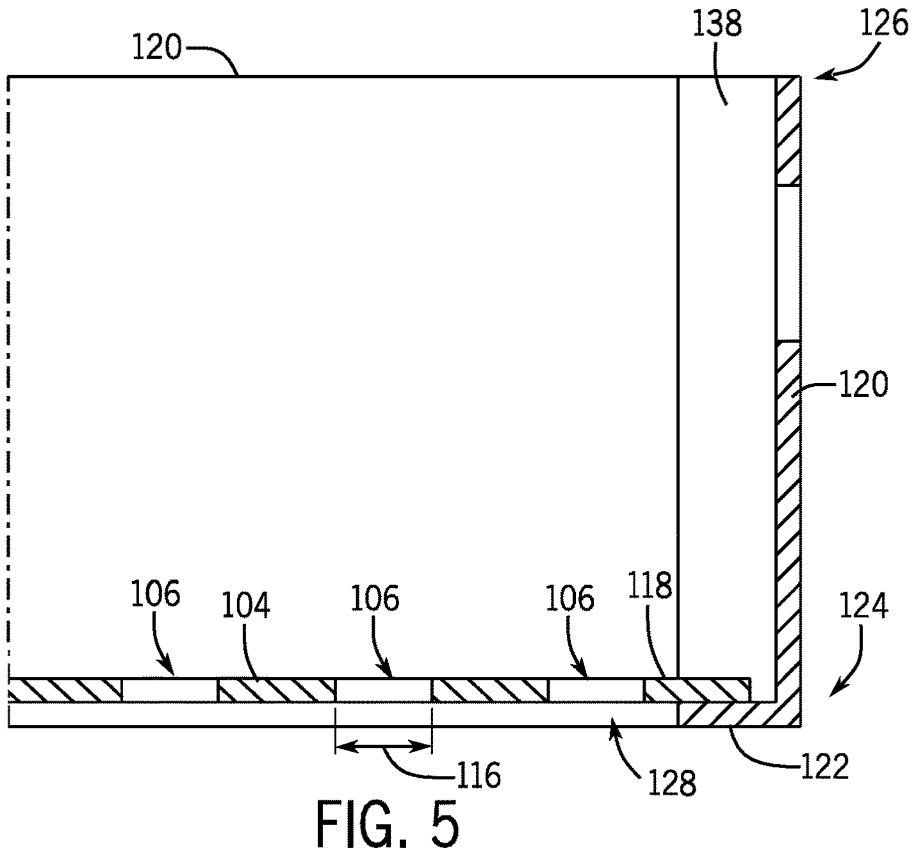
FIG. 5 is a sectional view of the stage of FIG. 4, taken along lines 5-5 shown in FIG. 4.

FIG. 5 is a sectional view of the sorting floor 104 shown in FIG. 4, taken along lines 5-5 shown in FIG. 4. With reference to FIGS. 4 and 5, in the example embodiment, each stage 102 includes walls 120. The walls 120 extend upward around a perimeter 118 of sorting floor 104 and cooperate with sorting floor 104 to define a receptacle 110 for objects 200 that are too large to pass through apertures 106 of sorting floor 104. In the example embodiment, the perimeter 118 is generally rectangular in shape and the walls 120 are four in number, each extending orthogonally upward from a corresponding edge of the rectangle. Alternatively, sorting floor 104 has any suitable shape and/or walls 120 have any suitable number and/or orientation that enables object-sorting apparatus 100 to function as described herein. For example, the perimeter 118 can be generally circular in shape (not shown) and walls 120 can extend generally upward from the perimeter to define a receptacle 110 that is generally cylindrical. In some embodiments, the walls 120 cooperate to define a closed perimeter 118 that defines a central opening 128 extending therethrough. The central opening 128 can extend over substantially all (for example, at least ninety percent) of a cross-sectional area enclosed by the perimeter 118 at a bottom edge 124 of the walls 120, which reduces or eliminates interference of the walls 120 or lip 122 with objects 200 passing through the apertures of the selected sorting plate 104 in the stage 102.

In some embodiments, the sorting floor 104 is generally planar, and apertures 106 are defined in and extend through the sorting floor 104. Each aperture 106 includes a minor (i.e., shortest) dimension 116 sized to receive therethrough objects 200 having minor dimension 206 less than the minor dimension 206 of the target object 200 for stage 102, but to stop or block objects 200 having minor dimension 206 equal to (or greater than) the minor dimension 206 of the target object 200. In the example embodiment, apertures 106 are arranged in an elongated grating pattern and have a major dimension (not numbered) much larger than their minor dimension 116. Alternatively, apertures 106 are provided in any suitable arrangement or shape that enables the sorting floor 104 to function as described herein. When the sorting floor 104 is positioned within the walls 120, the apertures 106 are placed into flow communication through the central opening 128 with the receptacle of a next lower stage 102.

In some embodiments, the sorting floor 104 is supported by a lip 122 that is rigidly coupled to the walls 120. For example, the lip 122 extends inwardly, and generally perpendicularly, from a bottom edge 124 of the walls 120, and the central opening 128 is defined interiorly of the lip 122. At least a portion of the perimeter 118 of the sorting floor 104 rests atop the lip 122, such that the sorting floor 104 is supported by the lip 122. The lip 122 can be sized and oriented to receive the perimeter 118 thereon after the sorting floor 104 is inserted from a position above the walls 120 and lowered (for example, by hand), in an orientation generally perpendicular to the walls 120, through the receptacle 110 towards the bottom edge 124.

Moreover, in some embodiments, the sorting floor 104 is freely supported by the lip 122. In other words, the sorting floor 104 is coupled to the stage 102 solely by the force of gravity acting on the weight of the sorting floor 104 and supported by the lip 122, and is otherwise unrestrained from vertical movement relative to the walls 120. This free support of the sorting floor 104 relative to the walls 120 advantageously imparts additional components of vibratory motion to the sorting floor 104, relative to the walls 120, when vibration is imparted to the stage 102 during operation of the object-sorting apparatus 100. For example, the sorting floor 104 can be jostled upwards (and in some embodiments, slightly sideways, corresponding to a clearance fit of the sorting floor 104 within the walls 120 as discussed further below) relative to the lip 122 and walls 120, in a non-linear or chaotic fashion by relatively simple vibratory motion imparted to the walls 120. In some embodiments, these additional components of vibratory motion advantageously facilitate rapid reorientation of the objects 200 on the sorting floor 104 during operation, which in turn improves an efficiency of causing objects 200 with a minor dimension 206 smaller than the minor dimension 116 of the apertures 106 to align with, and fall through, the apertures 106. In simpler terms, the free support of the sorting floor 104 relative to the walls 120 can cause the stage 102 to sort objects faster, as compared to a similar device with a rigidly attached floor. However, embodiments in which the sorting floor 104 is rigidly fastened to the walls 120 are also contemplated.

In some embodiments, the stage 102 is configured to enable the sorting floor 104 be lifted freely (for example, by hand) out of the receptacle 110, and to be easily replaced back into the stage 102 as well (when the stage is the top stage or is disassembled from the object-sorting apparatus 100, as discussed in more detail below). For example, the sorting floor 104 can be freely supported relative to the walls 120 as discussed above, or alternatively coupled to the lip 122 or walls 120 with manually releasable clips or other manually releasable fasteners (not shown). For another example, an inner cross-sectional profile of the receptacle 110 can be shaped to provide a clearance fit for the perimeter 118 of the sorting floor 104 to pass vertically between the lip 122 and a top edge 126 of the walls 120. This easy removability facilitates emptying of the target objects 200 collected in the aperture grating. Moreover, this easy removability facilitates fast and simple reconfiguration of the object-sorting apparatus 100 to sort different mixtures of objects 200, simply by interchanging sorting floors 104 in one or more stages. For example, a user can purchase a kit that includes a first number of stages 102 and a second, larger number of sorting floors 104, with each of the sorting floors 104 in the kit sized for interchangeability in the stages 102 (e.g., having a same size and shape of the perimeter 118), but having apertures 106 differently sized to retain a different size of object. As one example, the kit can include three stages 102 and five sorting floors 104, with the apertures 106 of the five sorting floors sized to retain five different sizes of objects. The user can easily adjust the object-sorting apparatus 100 to handle different mixtures of objects by selecting and installing, for each mixture, an appropriate subset of three of the five provided sorting floors 104 in the three available stages 102 placed atop the vibration base 150. As noted above, the presence of the central opening 128 reduces or eliminates interference of the walls 120 or lip 122 with the objects 200 passing through the apertures of the selected sorting plate 104 in each stage. However, embodiments in which the stage 102 is not configured to enable the sorting floor 104 to be lifted freely out of the receptacle 110 are also contemplated.

In the example embodiment, each pair of vertically adjacent stages 120 is coupled together by a plurality of stage couplings 130. Each stage coupling 130 can extend between the top edge 126 of one or more of the walls 120 of the lower of the pair of stages 120 and the bottom edge 124 of one or more of the walls 120 of the upper of the pair of stages 120. In the example embodiment, the plurality of stage couplings 130 between each pair of stages numbers four, with one stage coupling 130 positioned at each corner of the walls 120. However, other numbers or locations of stage couplings 130 are also contemplated.

In some embodiments, the stage couplings 130 facilitate easy stacking and disassembly of the plurality of stages 102. Moreover, in certain embodiments, each stage 102 including an installed sorting floor 104 weighs no more than six pounds. In other words, stages 102 can be easily stored, retrieved, and quickly added to and removed from the stack atop the vibration base 150 by hand in modular fashion to enable a rapid, in-the-field reconfiguration of the object-sorting apparatus 100 as needed to include any desired number of stages 102 and corresponding target sizes for objects 200. However, embodiments in which the stages 102 are not modularly stackable are also contemplated.

In the example embodiment, each stage coupling includes a pin member 132 extending between the top edge 126 and the bottom edge 124 of the respective lower and upper stages 120. Moreover, each stage 102 includes a corresponding pin-receiving member 138 positioned along the walls 120 in registered cooperation with each pin member 132. In the example embodiment, each pin-receiving member 138 is formed from a length of rectangular tubing affixed (for example, by spot welding) to the inner corners of each adjacent pair of walls 120, wherein a bore of the tubing is sized to receive the pin member 132 therein. The pin member 132 can be inserted into the pin-receiving member 138 of each stage coupling 130 along the top edge 126 of a lower stage 102, and the pin-receiving member 138 of each stage coupling 130 of the next upper stage 102 can be aligned with and vertically lowered onto the pin member 132 to couple the upper stage to the stack atop the vibration base 150. In the example embodiment, there is no securement of the pin member 132 to either the lower or upper stage 102, beyond that provided by the force of gravity acting on the weight of the pin member 132 and the upper stage 102. Accordingly, the upper stage 102 can be quickly removed from the stack as well. However, implementations in which the pin member 132 is secured to the upper or lower stage are also contemplated.

Also in the example embodiment, the tubing of the pin-receiving member 138 extends from the bottom edge 124 to the top edge 126 of the walls, such that the length of tubing can provide the pin-receiving member 138 for both an adjacent upper stage 102 and an adjacent lower stage 102. Further in the example embodiment, the perimeter 118 of the sorting floor 104 includes cut-outs in each corner sized to maintain the clearance fit between the perimeter 118 and the inner cross-sectional profile of the receptacle 110. The tubing implementation for the pin-receiving member 138 also advantageously can provide an increased strength and rigidity to the walls 120, particularly in the presence of vibration during operation of the object-sorting apparatus 100. However, other lengths, positions, or cross-sectional shapes are contemplated for the pin-receiving member 138.

Each stage coupling 130 also can include one or more spacers, such as an upper spacer 134 and a lower spacer 136, configured to circumscribe the pin member 132. The spacers can be configured to maintain a vertical position of the pin member 132 relative to the walls 120, without securing the pin member 132 to the stage as discussed above. For example, the pin member 132 can be a threaded bolt, and the lower spacer 136 can be a complementarily threaded nut having an outer dimension sized larger than a bore of the pin-receiving member 138, such that the lower spacer 136 cannot fit into the pin-receiving member 138. The lower spacer 136 can be threaded to a desired location along a middle portion of the pin member 132, such that the lower spacer 136 supports the pin member 132 against slipping too far down into the pin-receiving member 138 of the lower stage 102. Other implementations of the pin member 132 and spacers are also contemplated.

In addition, the spacers can be configured to facilitate handling and stacking of the stages 102. For example, the lower spacers 136 can be configured to serve as contact points with a floor or shelf when the stage 102 is disassembled from the object-sorting apparatus 100 and set aside or stored. Moreover, the lower spacers 136 can be used as visual or tactile indicators of a precise location of the bore of the pin-receiving member 138 during assembly of the stage onto the stack of stages 102.

In addition, a thickness of one or more of the spacers can be selected to establish a size of a gap 140 between the top edge 126 and the bottom edge 124 of the respective lower and upper stages 120. For example, the size of the gap 140 can facilitate visibility for a user into an operational state of a bottom or intermediate stage 102 in the stack of stages 102. Other configurations of the one or more spacers are also contemplated.

Other implementations of the stage couplings 130 are also contemplated.

Figure 6:
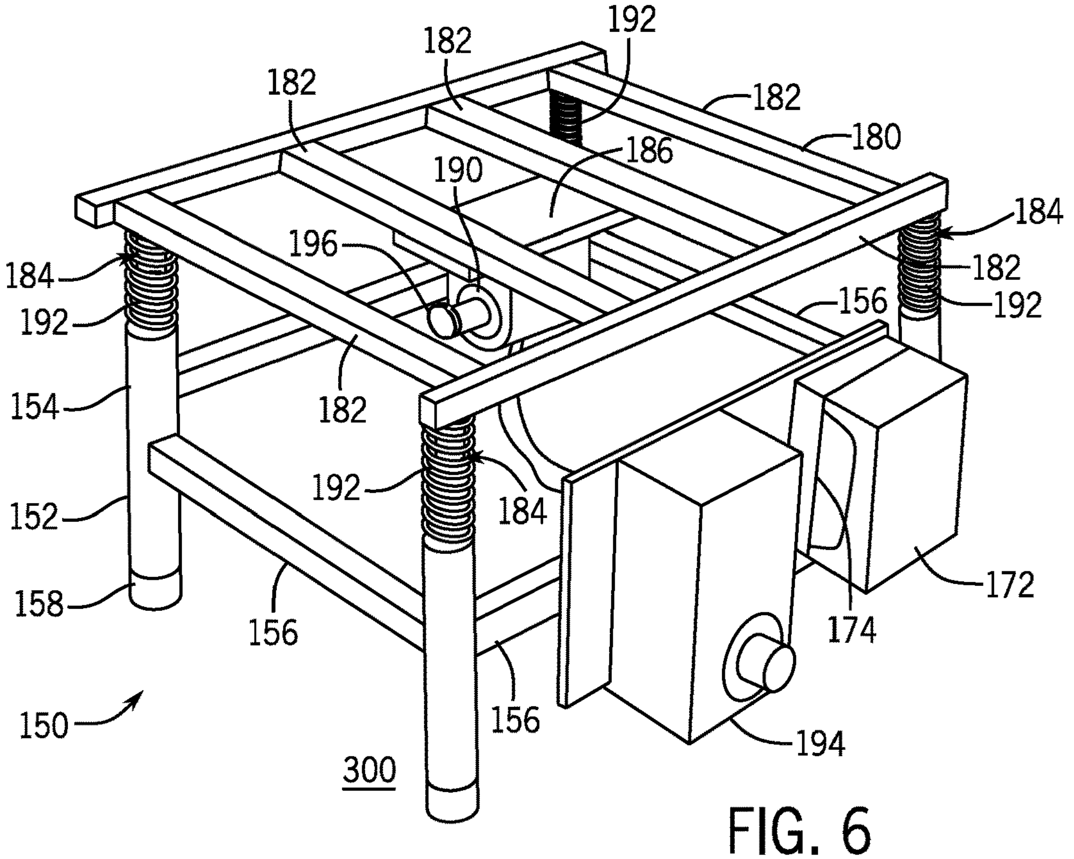
FIG. 6 is a perspective view of an example embodiment of a vibration base that may be used with the object-sorting apparatus of FIG. 1.

FIG. 6 is a perspective view of an example embodiment of the vibration base 150. With reference to FIG. 1 and FIG. 6, the vibration base 150 can include a foundation 152 and a vibration platform 180 positioned above the foundation 152. The foundation 152 is configured to rest on the surface 300 (e.g., a floor, table, or ground area) in an environment where the object-sorting apparatus 100 is to be used, and to provide a static interface between the surface 300 and the vibration platform 180. In addition, the foundation 152 can be configured to support a control interface 194 and a power supply 170. Alternatively, at least one of the control interface 194 and the power supply 170 can be coupled to another element of the object-sorting apparatus 100 or can be provided in or on a separate housing (not shown).

The foundation 152 can be formed from a plurality of elongated rigid members, which can provide structural stability to the object-sorting apparatus 100 while maintaining a relatively low weight of the foundation 152 to facilitate ease of handling and portability. In the example embodiment, the plurality of elongated members includes a plurality of legs 154, oriented generally vertically and including foot portions 158 configured to rest on the surface 300. In the example embodiment, each foot portion 158 can be adjustably positioned in the vertical direction relative to the corresponding leg 154, such as by a threaded coupling to a lower end of the leg 154, to enable a user to level the foundation 152. The plurality of elongated rigid members also includes a plurality of transverse members 156, which extend generally horizontally and are coupled to the legs 154 to define a stable frame for the object-sorting apparatus 100. In the example embodiment, the foundation 152 includes four legs 154 arranged at corners of a rectangular footprint, and four transverse members 156, with each transverse member 156 affixed between an adjacent pair of legs 154 to stabilize the foundation 152. However, other implementations of the foundation 152 are also contemplated.

The vibration platform 180 is configured to support the stacked plurality of stages 102 thereon, and also to impart vibratory motion to the stages 102 during operation of the object-sorting apparatus 100. The vibration platform 180 can also be constructed from a plurality of elongated rigid members, designated platform members 182, arranged generally horizontally and coupled together to define a stable platform for the stacked stages 102. In the example embodiment, the vibration platform 180 includes two platform members 182 oriented generally parallel to each other and positioned at opposing sides of the vibration platform 180, and four additional platform members 182 extending between, and rigidly coupled to, the first two platform members 182. The four additional platform members 182 can be evenly spaced to distribute a load of the stacked stages 102. However, other implementations of the vibration platform 180 are also contemplated.

In addition, the vibration platform 180 is configured for coupling to the foundation 152 via a plurality of springs 192. The springs 192 extend generally vertically and enable the vibration platform 180 (and the stages 102 stacked thereon) to move in vibratory fashion relative to the foundation 152. For example, the vibration platform 180 can include coupling stubs 184 that extend vertically downward from one or more of the platform members 182. In the example embodiment, four coupling stubs 184 are positioned and oriented to align vertically with the four legs 154 of the foundation 152, and opposing ends of the corresponding four springs 192 are coupled respectively to a top portion of the legs 154 and the coupling stubs 184. In the example embodiment, the springs 192 each extend from a first end, coupled to a corresponding one of the coupling stubs 184, to a second end, coupled to a corresponding one of the legs 154. For example, the springs can be installed by sliding the first end over an outer surface of the coupling stub 184, and sliding the second end over an outer surface of the top portion of the leg 154.

Moreover, the outer surfaces can be ridged or otherwise configured to enhance a friction fit with the ends of the springs 192, which friction fit can be overcome by steadily manually pulling the spring vertically away from the leg or stub. Alternatively, the foundation 152 can include coupling portions (not shown) implemented separately from the legs 154 and aligned with the coupling stubs 184 of the vibration platform 180. Other implementations for coupling the springs 192 between the vibration platform 180 and the foundation 152 are also contemplated.

In the example embodiment, the springs 192 are configured for easy manual installation and removal from the object-sorting apparatus 100. In some embodiments, different sets of springs 192 (e.g., different sets each including four springs) can be provided in a kit with the object-sorting apparatus 100. Each set of springs 192 can have a different spring stiffness, such that each set of springs 192 provides different vibratory characteristics when the object-sorting apparatus 100 is operated. Accordingly, different sets of springs 192 can be configured for optimal use in sorting different mixtures of objects 200, and a user can quickly swap out sets of springs 192 as circumstances warrant.

The vibration platform 180 further includes a vibration element 190 mounted therein. For example, the vibration element 190 can be coupled to one or more of the platform members 182. The vibration element 190 is selectively operable to drive vibration of the vibration platform 180 to resettle and/or rearrange objects 200 on the sorting floor 104 of each stage 102, positioning undersized objects 200 to fall through the apertures 106. In some embodiments, the vibration element 190 in combination with the springs 192 is effective to sort a number of objects 200 sufficient to fill eight to ten stages 102 over three hours of operating time.

In some embodiments, the vibration base 150 formed from the plurality of elongated rigid members (e.g., legs 154, transverse members 156, and platform members 182) enables a weight of the assembled vibration base 150 to be less than 25 pounds, and in some cases no more than 20 pounds. The low weight of the vibration base 150, in combination with the ease of separating and re-coupling the foundation 152 and the vibration platform 180 as needed, facilitates an ease of storage and transport of the object-sorting apparatus 100, as well as an ease of manual handling, assembling, and disassembling the object-sorting apparatus 100 at various field or facility locations. Moreover, the vibration base 150 in such embodiments remains structurally dependable in supporting two, three, or more stages 102, plus a large volume of objects 200, thereon throughout operation of the object-sorting apparatus 100. This is further facilitated in embodiments in which each stage 102 weighs less than six pounds, as described above.

The vibration element 190 can include an electrical motor with a rotatable drive shaft, and a weighted element 196 coupled to the drive shaft in an asymmetrical (i.e., off-balance) alignment with the drive shaft, such that rotation of the weighted element 196 causes the motor to vibrate. Other implementations of the vibration element 190 are also contemplated. In the illustrated embodiment, the motor is mounted on the vibration platform 180 via an attachment plate 186 coupled to the platform members 182, and the drive shaft is oriented in a horizontal plane. Alternatively, the attachment plate 186 can be an L-bracket, such that the drive shaft is oriented in a vertical plane, which in some cases imparts a more efficient side-to-side component of vibrational movement to the stages 102. Other orientations and attachment elements for the vibration element 190 are also contemplated.

In some embodiments, the object-sorting apparatus 100 includes the control interface 194 configured to selectively activate the vibration element 190. The control interface 194 can be operable to adjust one or more of a magnitude, a frequency, and/or a duration of the vibration output by the vibration element 190. In the example embodiment, the control interface 194 is coupled to the foundation 152 and includes manually operable physical controls, such as switches and/or dials, to input settings for parameters such as those discussed above. Additionally or alternatively, the control interface 194 is configured to wirelessly receive, for example from an application executing on a smart phone or other external computing device (not shown), instructions and parameters for operating the vibration element 190.

In the example embodiment, the power supply 170 is a rechargeable battery 172 that can be removably inserted into a battery clip 174. The battery clip 174 can be wired to supply power from the rechargeable battery 172 to the vibration element 190 via the control interface 194. In the example embodiment, the battery clip 174 is coupled to the foundation 152. The rechargeable battery 172 can be a standard off-the-shelf lithium-ion battery compatible with handheld power tools (e.g., rated for 18-21 volts and 2-3 ampere-hours), which facilitates an ease of replacing, charging, and maintaining the battery. Moreover, such a rechargeable battery 172 can be sufficient to drive the vibration element 190 for effective sorting of the objects 200 for 3 hours on a single charge. However, other types of batteries are contemplated for use with the vibration element 190. In some embodiments, the use of the rechargeable battery 172, in combination with the other portability and modularity features as described herein, facilitates the use of the object-sorting apparatus 100 at multiple locations in the field or in temporary facility locations. For example, a user can transport the object-sorting apparatus 100 to provide sorting as a service to multiple customer locations on a daily basis, without requiring any of the multiple locations to reserve floor space near a power outlet for the sorting operation. However, embodiments in which the power supply 170 includes an AC adapter that enables the object-sorting apparatus 100 to plug in to facility power are also contemplated.

Figure 7:
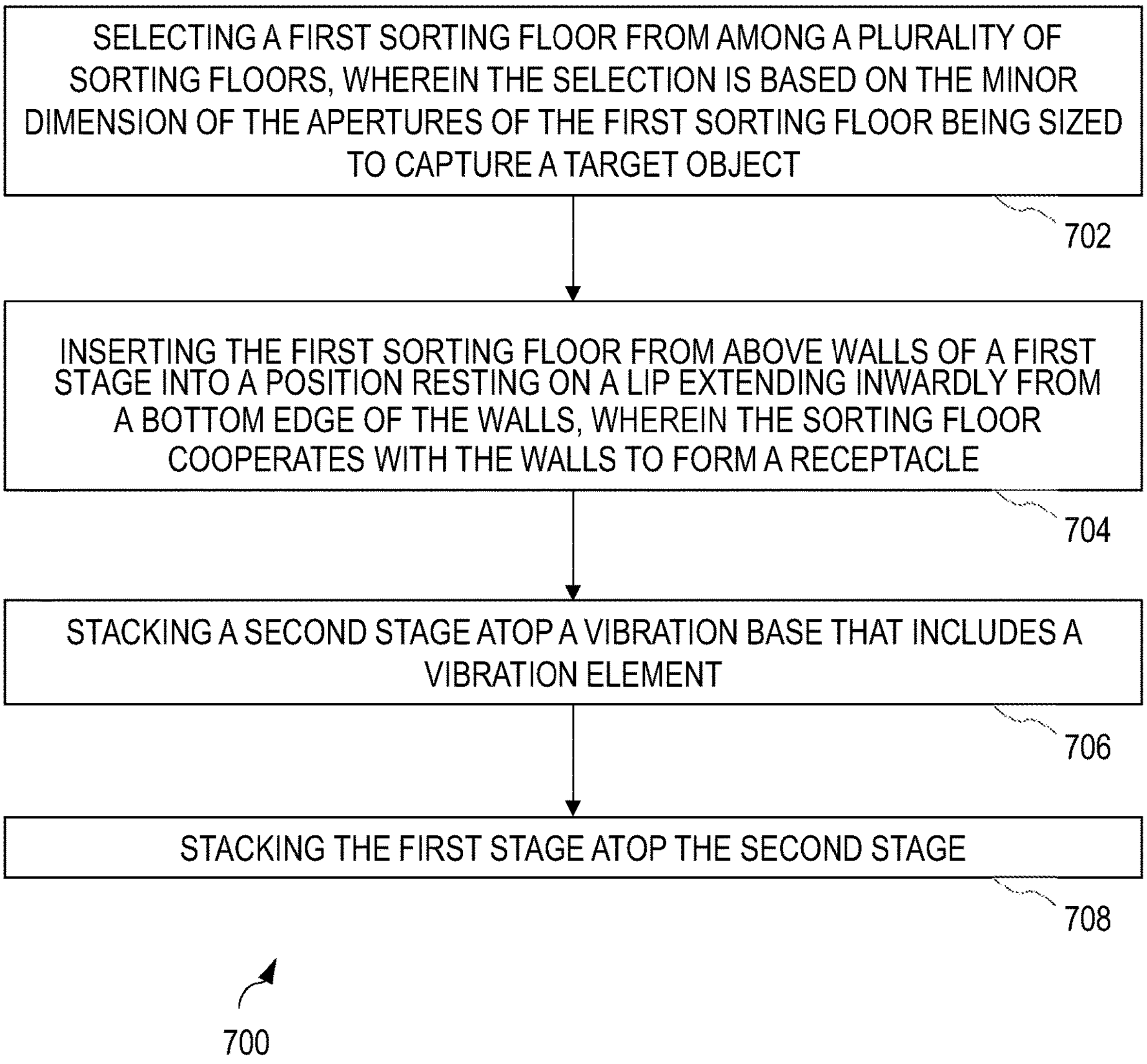
FIG. 7 is a flow diagram of an example embodiment of a method of assembling an object-sorting apparatus, such as the object-sorting apparatus of FIG. 1.

FIG. 7 is a flow diagram of an example embodiment of a method 700 of assembling an object-sorting apparatus, such as the object-sorting apparatus 100. In the example, the method 700 includes selecting a first sorting floor from among a plurality of sorting floors (702). Each of the sorting floors includes a plurality of apertures extending therethrough, and a minor dimension of the apertures of the first sorting floor is different from the minor dimension of the apertures of others of the sorting floors. The selection is based on the minor dimension of the apertures of the first sorting floor being sized to capture a target object. The method 700 can also include inserting the first sorting floor from above walls of a first stage into a position resting on a lip extending inwardly from a bottom edge of the walls, the lip defining a central opening extending therethrough, wherein the inserted sorting floor cooperates with the walls to form a receptacle (704). The method 700 can further include stacking a second stage atop a vibration base including a vibration element (706), and stacking the first stage atop the second stage (708).

Figure 8:
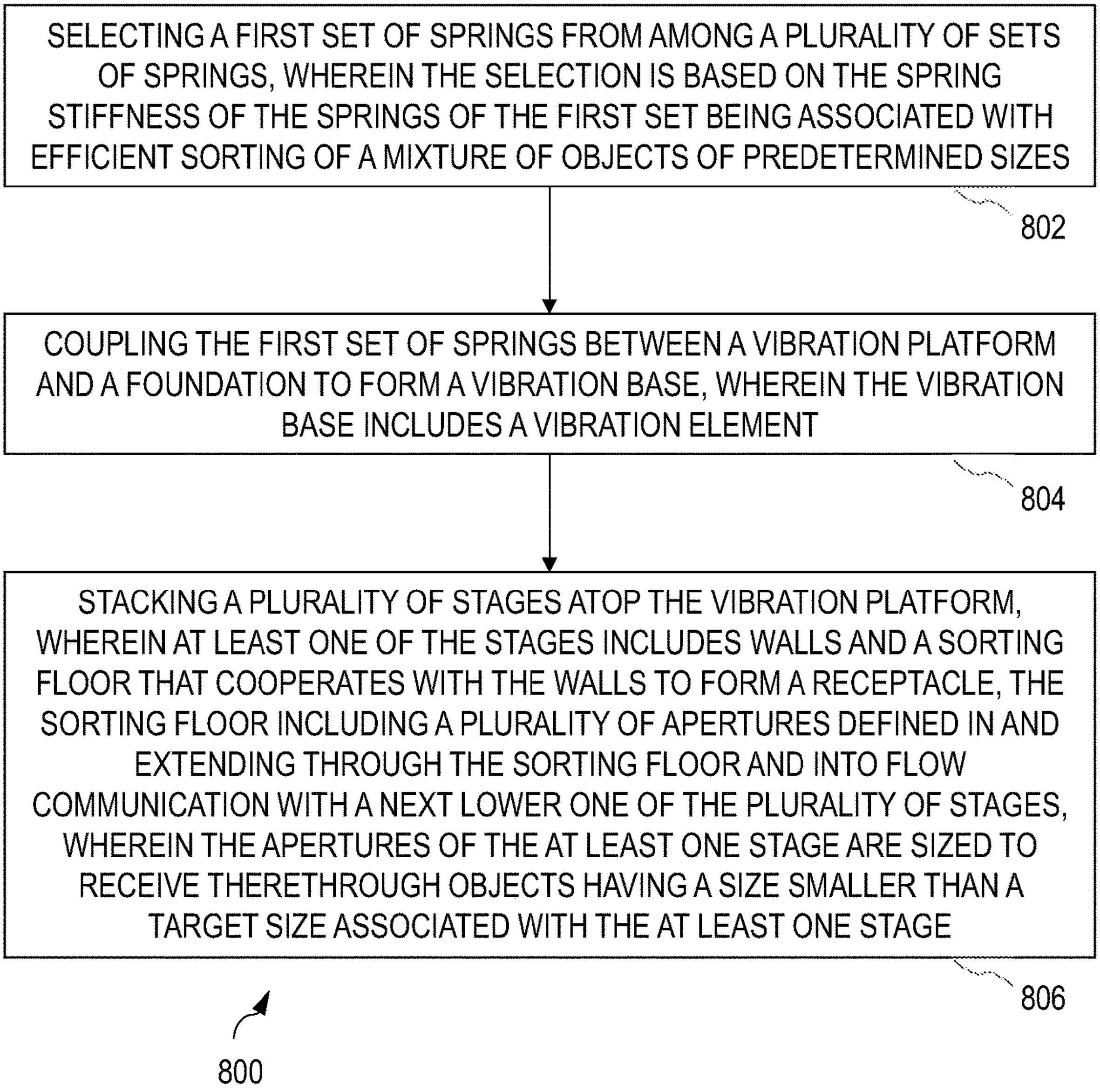
FIG. 8 is a flow diagram of an example embodiment of another method of assembling an object-sorting apparatus, such as the object-sorting apparatus of FIG. 1.

FIG. 8 is a flow diagram of an example embodiment of a method 800 of assembling an object-sorting apparatus, such as the object-sorting apparatus 100. In the example, the method 800 includes selecting a first set of springs from among a plurality of sets of springs (802). A spring stiffness of the springs of the first set is different from the spring stiffness of the springs of others of the sets, and the selection is based on the spring stiffness of the springs of the first set being associated with efficient sorting of a mixture of objects of predetermined sizes. The method 800 can also include coupling the first set of springs between a vibration platform and a foundation to form a vibration base, wherein the vibration base includes a vibration element (804). The method 800 can further include stacking a plurality of stages atop the vibration platform, wherein at least one of the stages includes walls and a sorting floor that cooperates with the walls to form a receptacle (806). The sorting floor includes a plurality of apertures defined in and extending through the sorting floor and into flow communication with a next lower one of the plurality of stages, and the apertures of the at least one stage are sized to receive therethrough objects having a size smaller than a target size associated with the at least one stage.

Examples of a vibratory object-sorting apparatus are described above in detail. The apparatus is not limited to the specific examples described herein, but rather, components of the apparatus may be used independently and separately from other components and environmental elements described herein. For example, the apparatus described herein may be used to sort any category of objects having a suitable range of sizes for sorting s described herein.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing [s] shall be interpreted as illustrative and not in a limiting sense.

What is claimed is:

1. An object-sorting apparatus comprising:

a vibration base comprising a vibration element, a foundation configured to rest on a surface in the environment, and a vibration platform positioned above the foundation, wherein the vibration element is mounted on the vibration platform;

a plurality of stages stackable on the vibration base, wherein at least one of the stages comprises:

walls defining a central opening; and a sorting floor that cooperates with the walls to form a receptacle, the sorting floor comprising a plurality of apertures defined in and extending through the sorting floor and into flow communication through the central opening with a next lower one of the plurality of stages, wherein the apertures of the at least one stage are sized to receive therethrough objects having a size smaller than a target size associated with the at least one stage; and a kit including a plurality of sets of springs, each set configured to couple the vibration platform to the foundation, each set having a spring stiffness that differs from others of the sets.

2. The object-sorting apparatus of claim 1, wherein the sorting floor is freely supported relative to the walls.

3. The object-sorting apparatus of claim 2, wherein the at least one stage further comprises a lip that extends inwardly from the walls, and wherein at least a portion of a perimeter of the sorting floor rests freely atop the lip.

4. The object-sorting apparatus of claim 1, wherein an inner cross-sectional profile of the receptacle is shaped to provide a clearance fit for a perimeter of the sorting floor.

5. The object-sorting apparatus of claim 4, further comprising a kit including a plurality of sorting floors each having a same size of the perimeter.

6. The object-sorting apparatus of claim 1, wherein the springs extend vertically and enable the vibration platform to move in vibratory fashion relative to the foundation.

7. An object-sorting apparatus comprising:

a vibration base comprising a vibration element, a foundation configured to rest on a surface in the environment, and a vibration platform positioned above the foundation, wherein the vibration element is mounted on the vibration platform, wherein the vibration platform comprises:

a plurality of platform members arranged horizontally and coupled together; and coupling stubs that extend vertically downward from one or more of the platform members, wherein the springs each extend from a first end to a second end, and the first end of each of the springs is coupled to a corresponding one of the coupling stubs;

a plurality of stages stackable on the vibration base, wherein at least one of the stages comprises:

walls defining a central opening; and a sorting floor that cooperates with the walls to form a receptacle, the sorting floor comprising a plurality of apertures defined in and extending through the sorting floor and into flow communication through the central opening with a next lower one of the plurality of stages, wherein the apertures of the at least one stage are sized to receive therethrough objects having a size smaller than a target size associated with the at least one stage; and a plurality of springs coupling the vibration platform to the foundation.

8. The object-sorting apparatus of claim 7, wherein the first end is slidingly coupled over an outer surface of the coupling stub.

9. The object-sorting apparatus of claim 7, wherein the foundation comprises a plurality of legs, and the second end of each of the springs is coupled to a corresponding one of the legs.

10. The object-sorting apparatus of claim 7, wherein each of the legs is vertically aligned with a corresponding one of the coupling stubs.

11. The object-sorting apparatus of claim 9, wherein the legs include foot portions configured to rest on the surface.

12. The object-sorting apparatus of claim 7, further comprising a kit including a plurality of sets of springs, each set having a spring stiffness that differs from others of the sets.

13. The object-sorting apparatus of claim 1, wherein the vibration element comprises an electrical motor.

14. The object-sorting apparatus of claim 13, wherein the electrical motor comprises a drive shaft, and the vibration element further comprises a weighted element coupled to the drive shaft in an asymmetrical alignment with the drive shaft.

15. The object-sorting apparatus of claim 14, wherein the drive shaft is oriented in a vertical plane.

16. The object-sorting apparatus of claim 1, further comprising a power supply coupled to the vibration base.

17. The object-sorting apparatus of claim 16, wherein the power supply comprises a rechargeable battery.

18. The object-sorting apparatus of claim 17, wherein the rechargeable battery comprises a standard off-the-shelf lithium-ion battery compatible with handheld power tools.

19. A method of assembling an object-sorting apparatus, the method comprising:

selecting a first sorting floor from among a plurality of sorting floors, wherein each of the sorting floors comprises a plurality of apertures extending therethrough, wherein a minor dimension of the apertures of the first sorting floor is different from the minor dimension of the apertures of others of the sorting floors, and wherein the selection is based on the minor dimension of the apertures of the first sorting floor being sized to capture a target object, and wherein the apertures are sized to receive therethrough objects having a size smaller than a target size of the target object associated with the first sorting floor;

inserting the first sorting floor from above walls of a first stage into a position resting on a lip extending inwardly from a bottom edge of the walls, the lip defining a central opening extending therethrough, wherein the inserted sorting floor cooperates with the walls to form a receptacle;

stacking a second stage atop a vibration base, the vibration base including a vibration element, a foundation configured to rest on a surface in the environment, and a vibration platform positioned above the foundation, wherein the vibration element is mounted on the vibration platform;

stacking the first stage atop the second stage, wherein the plurality of apertures of the inserted first sorting floor are in flow communication through the central opening with the second stage; and a plurality of springs coupling the vibration platform to the foundation.

20. The method of claim 19, further comprising, prior to the step of inserting the first sorting floor, removing a second sorting floor of the plurality of sorting floors from the position resting on the lip.

* * * * *